April 19, 1966     D. B. CHENOWETH ETAL     3,246,821
STAMP DISPENSER
Filed Oct. 14, 1963                                    8 Sheets-Sheet 1
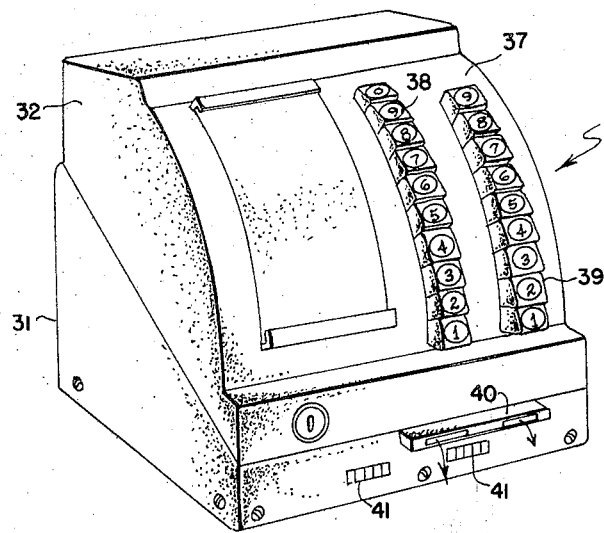
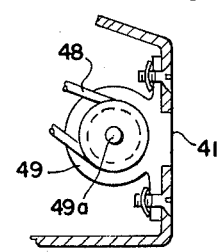
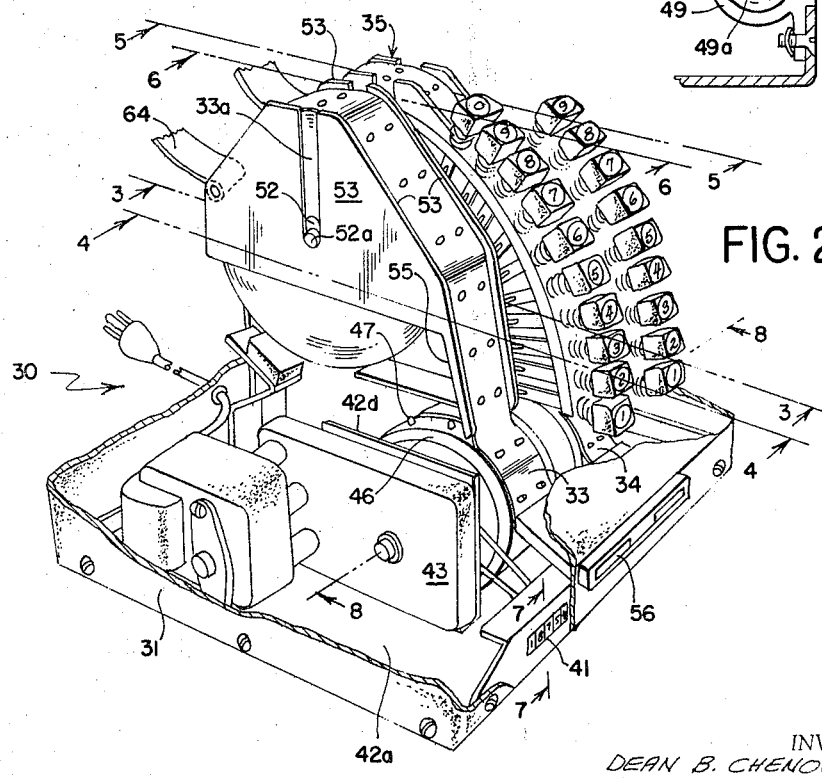
INVENTORS
DEAN B. CHENOWETH
GORDON V. MOMMSEN
NEIL M. CLARK
ALEXANDER JAMES GILCHRIST
BY Williamson & Palmatier
ATTORNEYS

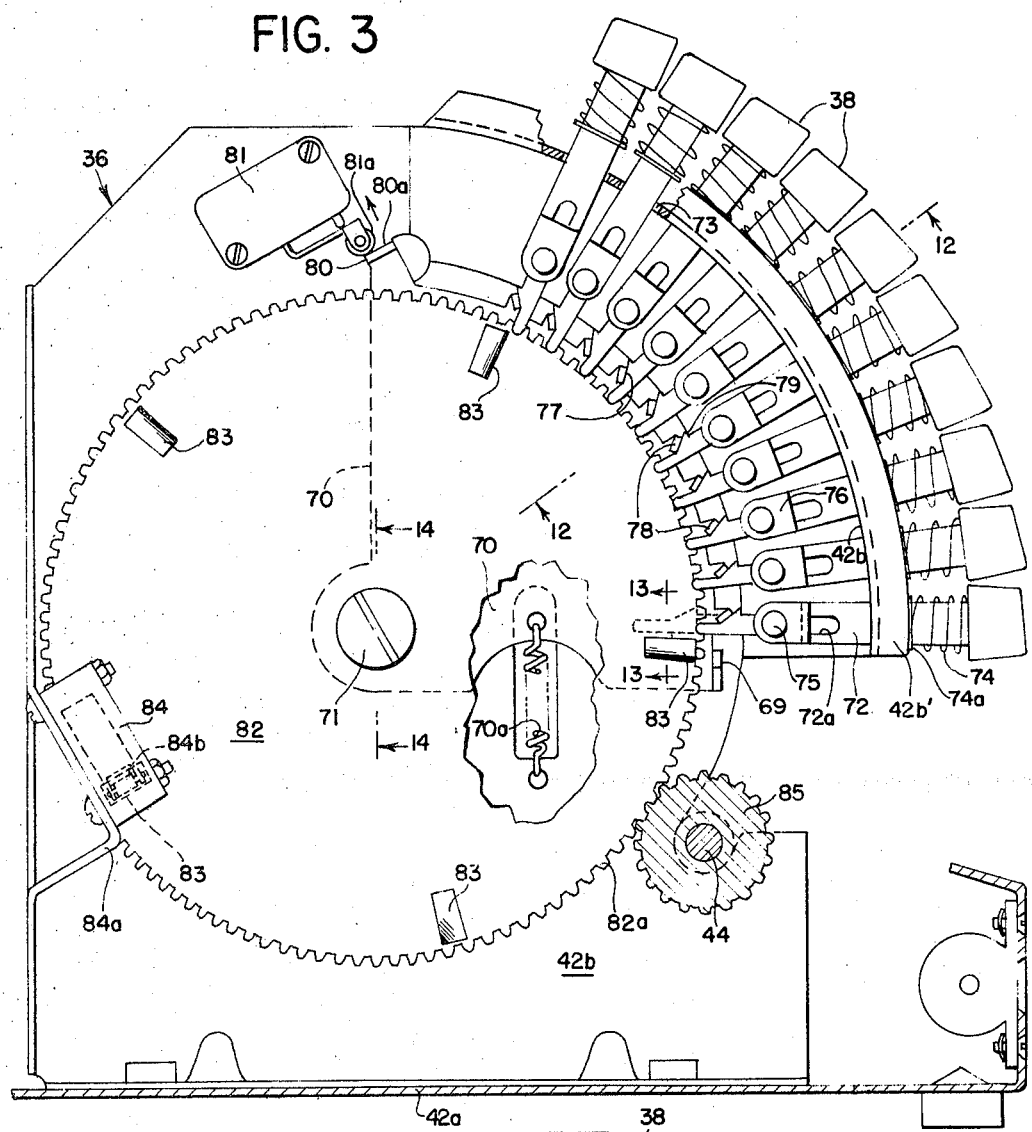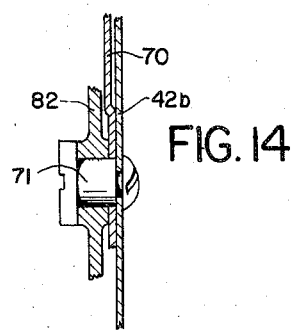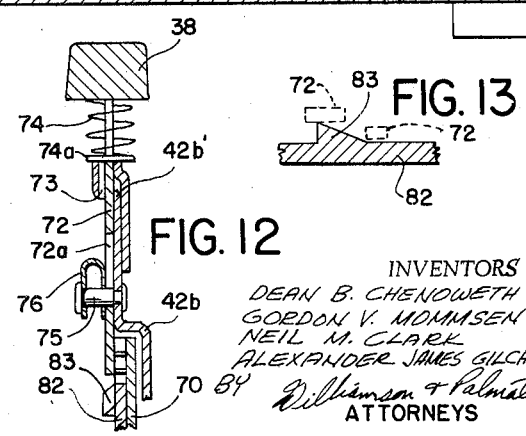

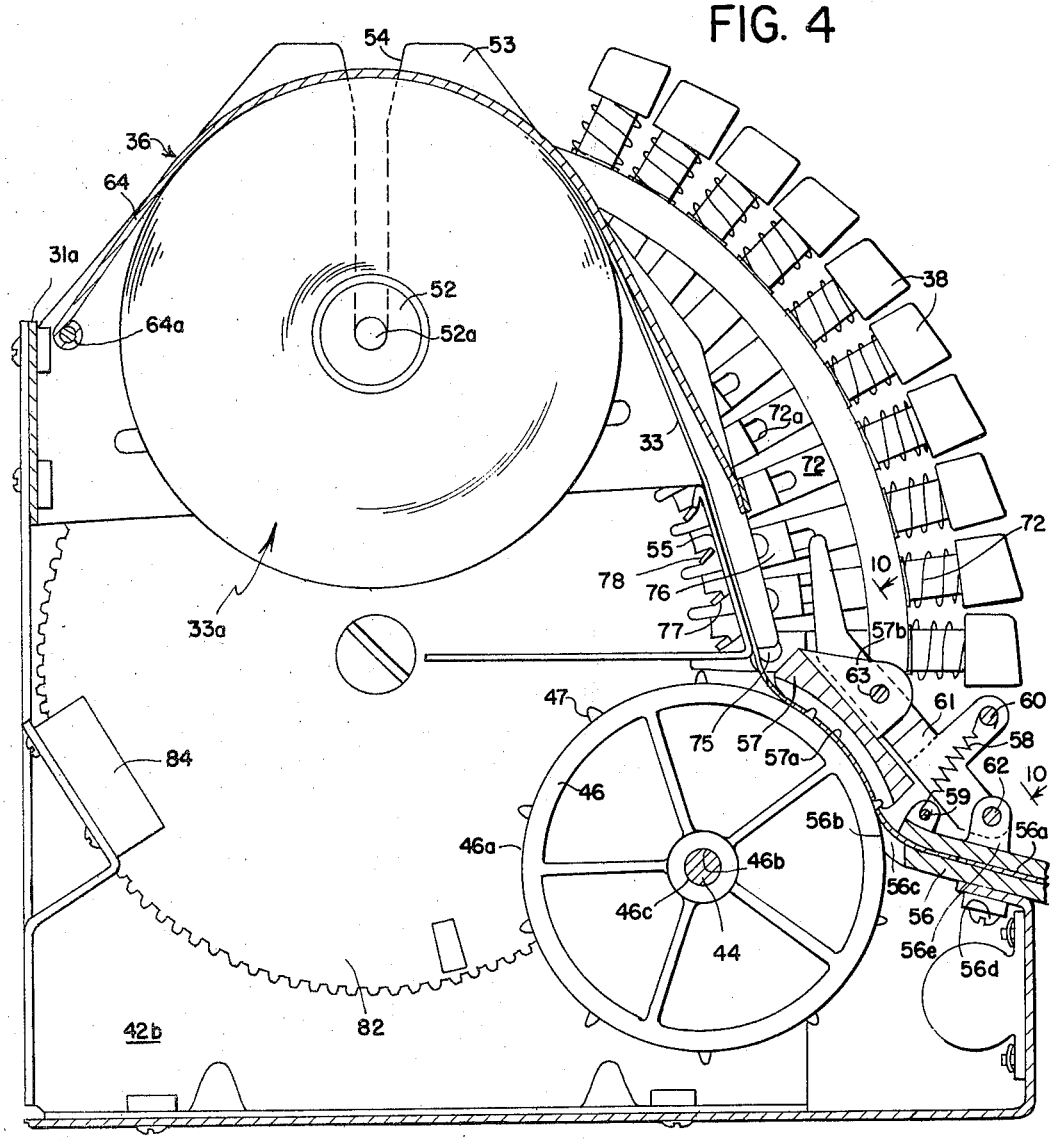

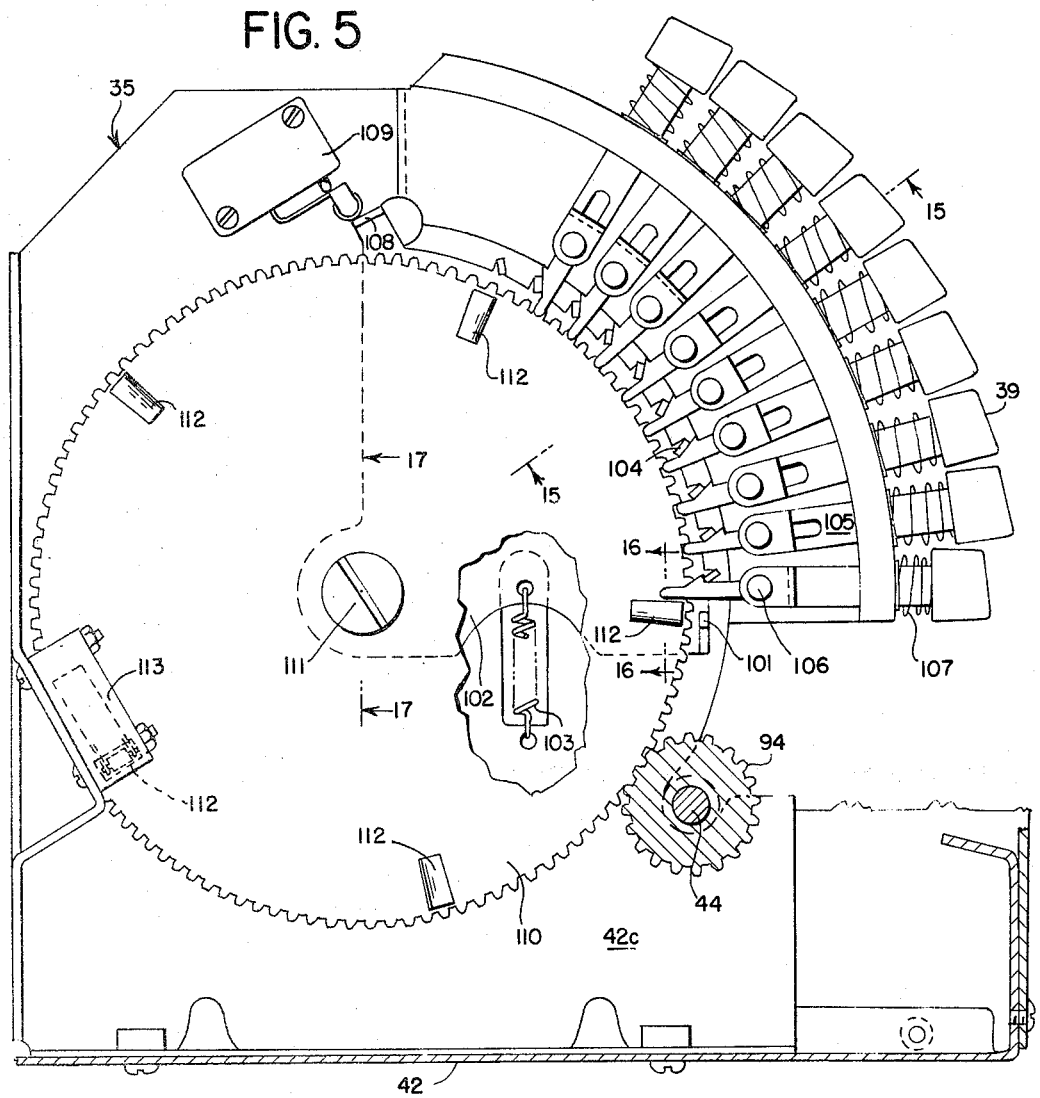
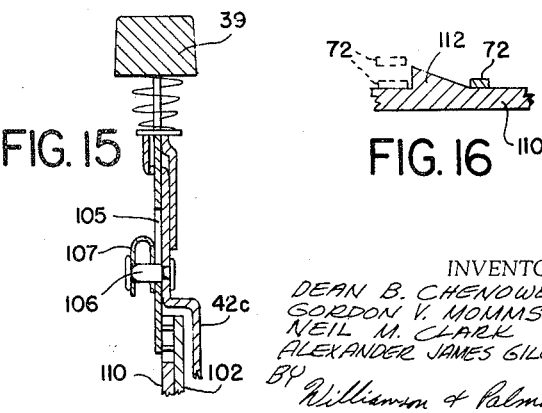

April 19, 1966  D. B. CHENOWETH ETAL  3,246,821
STAMP DISPENSER

Filed Oct. 14, 1963  8 Sheets-Sheet 6

INVENTORS
DEAN B. CHENOWETH
GORDON V. MOMMSEN
NEIL M. CLARK
ALEXANDER JAMES GILCHRIST
BY Williamson & Palmatier
ATTORNEYS INVENTORS
DEAN B. CHENOWETH
GORDON V. MOMMSEN
NEIL M. CLARK
ALEXANDER JAMES GILCHRIST
BY Williamson & Palmatier
ATTORNEYS April 19, 1966  D. B. CHENOWETH ET AL  3,246,821
STAMP DISPENSER Filed Oct. 14, 1963  8 Sheets-Sheet 8

INVENTORS
DEAN B. CHENOWETH
GORDON V. MOMMSEN
NEIL M. CLARK
ALEXANDER JAMES GILCHRIST
BY Williamson & Palmatier
ATTORNEYS

United States Patent Office 3,246,821
Patented Apr. 19, 1966

3,246,821
STAMP DISPENSER
Dean B. Chenoweth, Gordon V. Mommsen, Neil M. Clark, and Alexander James Gilchrist, Minneapolis, Minn., assignors to Astad Corporation, Minneapolis, Minn., a corporation of Minnesota
Filed Oct. 14, 1963, Ser. No. 315,894
12 Claims. (Cl. 226—135)

This invention relates to a machine for dispensing predetermined numbers of stamps from a roll.

In the past, mechanisms for dispensing stamps in predetermined numbers of stamps from a roll. ever, such prior mechanisms have had several distinct disadvantages. For instance, such stamp dispensing mechanisms have been unduly complicated and have had an unnecessarily large number of operating parts. Furthermore, difficulty has heretofore been encountered in obtaining a speed of operation which is sufficient to avoid unnecessary delay in the issuance of such stamps. It will be understood that trading stamps, commonly issued along with the purchase of goods in a store must be handled quickly so that the overall time in making a transaction is not materially lengthened by the fact that trading stamps are issued.

An object of the invention is to provide a new and improved stamp-dispensing mechanism of simple and inexpensive construction and operation.

Another object of the invention is the provision in a stamp dispensing mechanism, of a novel apparatus for simultaneously counting and driving the number of stamps dispensed and positively stopping the driving operation when the predetermined number of stamps have been ejected.

Another object of the invention is the provision in a stamp vending machine of new and novel apparatus facilitating the ready and easy replacement of a supply of stamps in roll form while maintaining a desired control on the roll of stamps as to prevent the stamps from the roll from jamming the machine as the stamps are suddenly stopped and started in a dispensing operation.

The further object of the invention is for the provision in a stamp dispensing machine of improved apparatus for commencing the operation of the dispensing mechanism and retain the dispensing mechanism in operation during the desired dispensing of a predetermined number of articles and cause a subsequent release of the actuating mechanism and returning or indexing of the apparatus to a predetermined start condition so as to be immediately prepared for another cycle of operation.

The still further object of the invention is the provision of a novel mechanism for a predetermined operational cycle and operated by a single motor or source of rotary power so as to permit dispensing of one or a plurality of stamps or other articles within said predetermined cycle of operation, regardless of the length of time of operation of the motor so as to facilitate the powering of a number of similar dispensing mechanisms from the single motor or source of rotary power.

These and other objects and advantages of our invention will more fully appear from the following description made in connection with the accompanying drawings wherein like reference characters refer to similar parts through the several views and in which:

FIG. 1 is a perspective view of one form of the invention;

FIG. 2 is a perspective view of the invention with the cover cut away for clarity of detail;

FIG. 3 is a detail section view taken approximately at 3—3 in FIG. 2;

FIG. 4 is a detail section taken approximately at 4—4 in FIG. 2;

FIG. 5 is a section view taken approximately at 5—5 in FIG. 2;

FIG. 7 is an enlarged detail section view taken approximately at 7—7 in FIG. 2;

FIG. 12 is an enlarged detail section showing a key bar in assembly and as taken at 12—12 in FIG. 3;

FIG. 13 is an enlarged detail section view taken approximately at 13—13 in FIG. 3 and showing one of the key bars in various positions by dotted lines;

FIG. 14 is an enlarged detail section view taken approximately at 14—14 in FIG. 3;

FIG. 15 is a detail section view taken approximately at 15—15 in FIG. 5;

FIG. 16 is an enlarged detail section view taken approximately at 16—16 in FIG. 5;

FIG. 17 is a detail section view taken approximately at 17—17 in FIG. 5;

Figure 6:
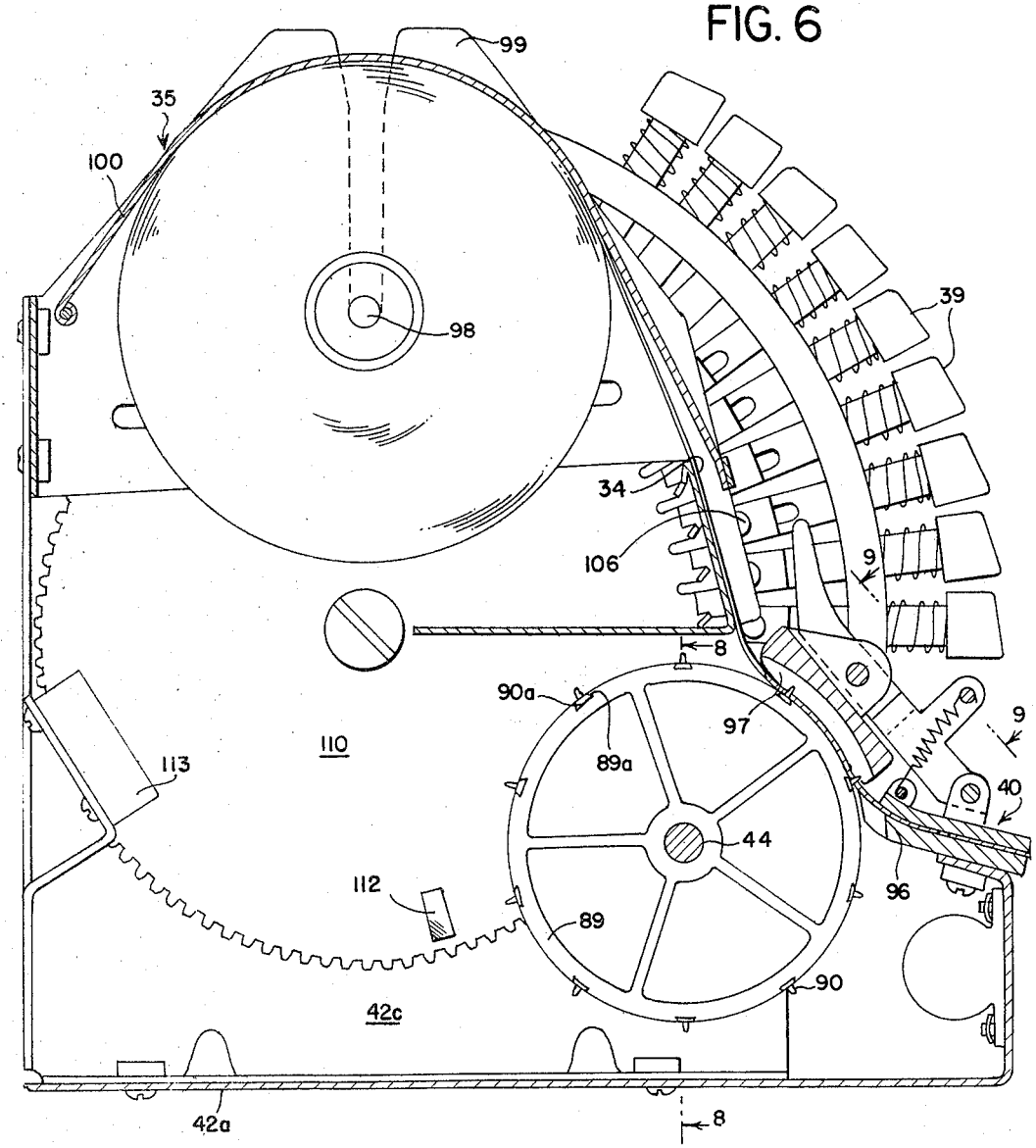
FIG. 6 is a detail section view taken approximately at 6—6 in FIG. 2.
Figure 24:
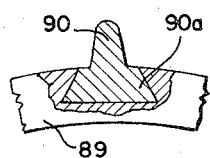
FIG. 24 is an enlarged detail section view taken approximately at 24—24 in FIG. 8.

One form of the present invention is shown in the drawings and is described herein.

Figure 22:
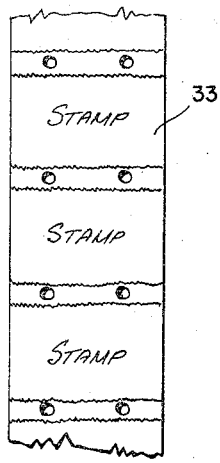
FIG. 22 is an elevation view of a strip of stamps to be dispensed by a portion of the mechanism.
Figure 23:
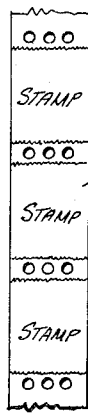
FIG. 23 is an elevation view of a strip of stamps of the type dispensed by another portion of the mechanism.

The stamp dispensing machine is indicated in general by numeral 30 and is generally confined within a housing 31 having a removable cover 32. The machine is adapted to dispense stamps 33 and 34 as illustrated in FIGS. 22 and 23 which are designated differently to have different values. For purposes of this description the stamps 33 are designated as dollar stamps with the understanding that each of the trading stamps 33 is issued as a result of a purchase price of articles in a store in the amount of $1.00; and the stamps 34 are regarded as tens stamps and each is issued in connection with merchandise amounting to 10¢ valuation. The tens stamps 34 are dispensed by the apparatus indicated in general by numeral 35 and illustrated in considerable detail in FIGS. 5, 6, 8, 9, 15–17, 19 and 21. The dispensing apparatus for the dollar stamps 33 is indicated in general by numeral 36 and is illustrated in considerable detail in FIGS. 3, 4, 8, 12–13, 18 and 19.

In FIG. 1, the dispenser 30 will be seen to have a front control panel 37 through which the keys 38 and 39 extend respectively operating the dollar stamp dispenser 36 and tens stamps dispenser 35. A stamp guide 40 delivers the stamps outwardly of the case, and ports 41 are provided for viewing counters which indicate the numbers of dollar and tens stamps dispensed.

Figure 8:
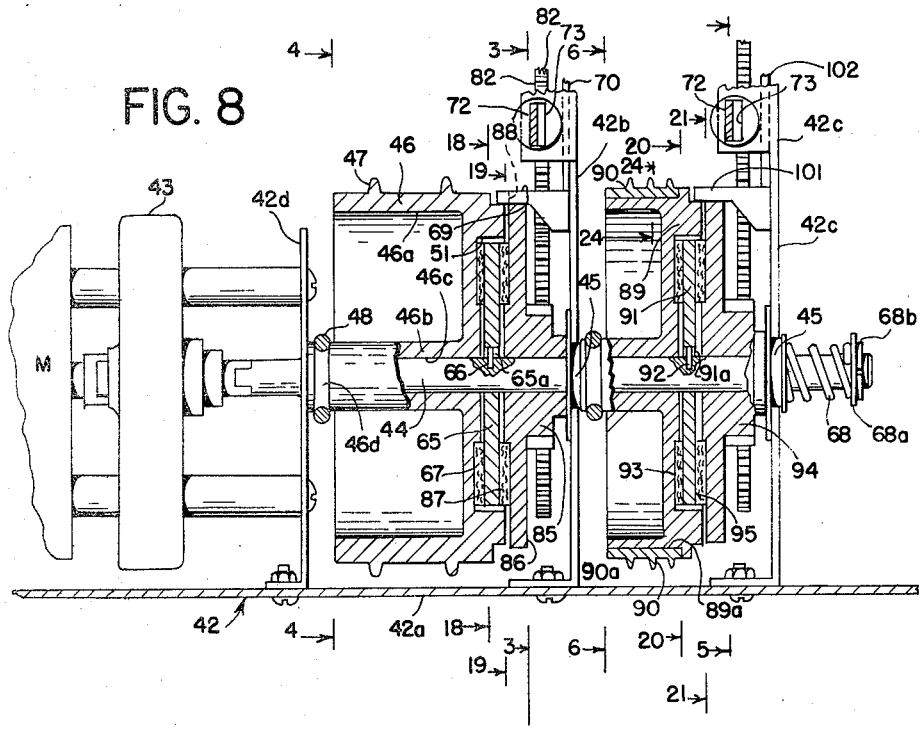
FIG. 8 is an enlarged detail section view taken approximately at 8—8 in FIG. 2.
Figure 25:
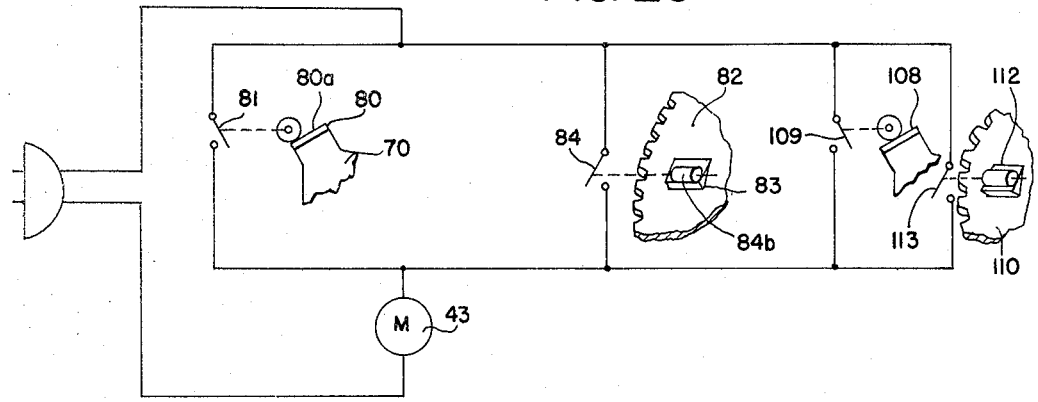
FIG. 25 is an electro-mechanical diagrammatic sketch illustrating the operating circuitry of the present invention.
Figure 9:
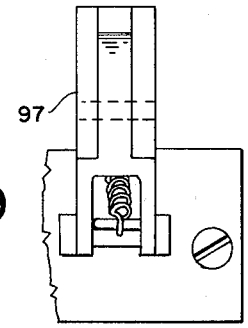
FIG. 9 is a detail elevation view as viewed at an oblique angle as indicated at 9—9 in FIG. 6.
Figure 11:
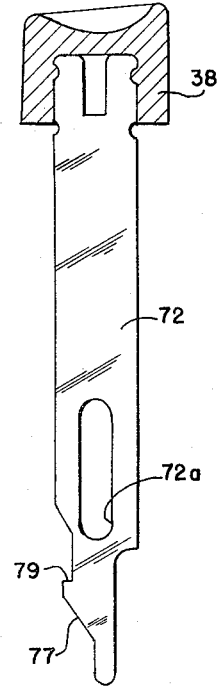
FIG. 11 is an enlarged detail view of one of the key bars.
Figure 10:
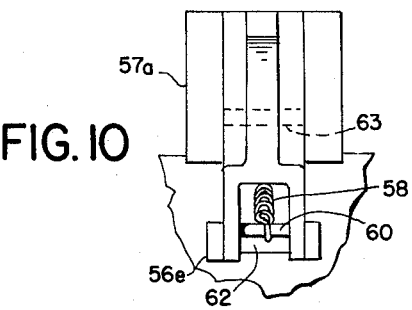
FIG. 10 is a detail elevation view as viewed at an oblique angle as indicated at 10—10 in FIG. 4.

The dispenser apparatus 30 is provided with a frame indicated in FIG. 8 by numeral 42, and the frame includes a rigid base plate 42a, a pair of upright mounting plates 42b and 42c for respectively mounting the mechanisms of dollar and tens dispensing apparatus 36 and 35 respectively, and an additional upright mounting plate 42d to which the drive motor and speed reducing gearing mechanism 43 is mounted. Of course the casing 31 is affixed to the base plate 42a such as by screws.

A common drive shaft 44 is attached to the output shaft of the motor 43 and is journaled in bearings 45 on the mounting plates 42b and 42c. The drive shaft 44 provides rotary power to the dispensing apparatus 35 and 36 which controls operation of motor 43.

The dollar stamp dispensing apparatus includes a stamp feed roll 46 having a cylindrical periphery 46a with a plurality of rows of stamp driving teeth 47 protruding radially therefrom. The teeth 47 are of such size as to match the holes in the strip of stamps 33 and so as to easily project into and withdraw from the holes for feeding the stamps thereover. It will be noted that the feed roll 46 has a diameter such that ten rows of teeth 47 are equally spaced around the periphery of the feed roll. As will be seen hereinafter, the maximum number of stamps dispensed in any one cycle of operation is ten and the feed roll 46 will turn to a maximum of one complete revolution during each operational cycle. The central hub 46b of the stamp feed roll 46 has a bearing aperture 46c which receives the shaft 44 therethrough. The feed roll 46 is freely rotatable on the shaft 44 so as to permit the feed roll 46 to be stopped regardless of continued rotation of the shaft. The hub of the feed roll 46 is provided with an annular groove 46d around which a continuous belt 48 is trained for driving the input shaft 49a of counter 49 so that the counter 49 will record all rotation of the stamp feed roll 46. It will be noted in FIG. 7 that the counter 49 is affixed to the case 31 of the dispenser so as to be visible through one of the viewing ports 41.

It should be noted that the feed roll 46 is formed of a rigid molded plastic material of sufficient toughness and durability as to easily drive the strip of stamps 33 over a continued period. The end of the hub 46a bears against frame plate 42d so as to be restrained thereby from movement along the shaft 44.

Figure 18:
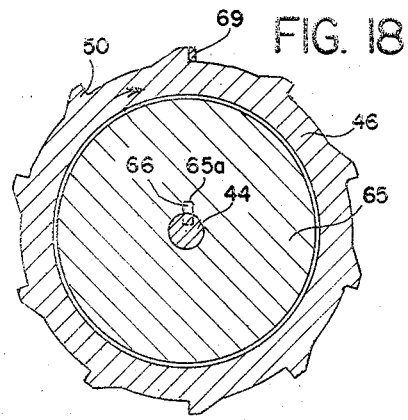
FIG. 18 is a detail section view taken approximately at 18—18 in FIG. 8.
Figure 20:
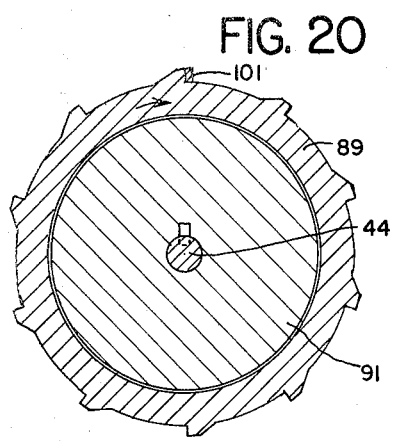
FIG. 20 is a detail section taken at 20—20 in FIG. 8.
Figure 19:
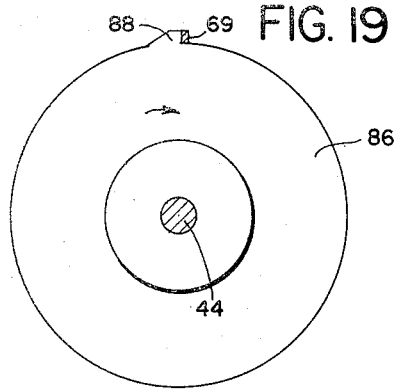
FIG. 19 is a detail section view taken approximately at 19—19 in FIG. 8.
Figure 21:
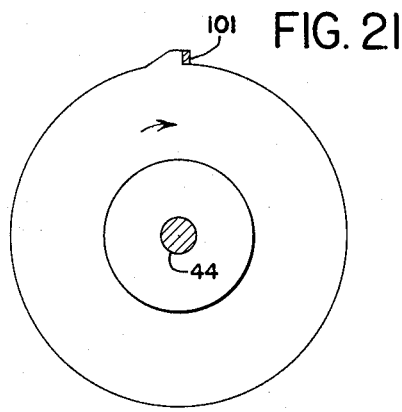
FIG. 21 is a detail section view taken at 21—21 in FIG. 8.

As illustrated in FIGS. 8 and 18, the feed roll 46 has at one end thereof and adjacent the outer periphery, a plurality of abutments formed integrally which may be engaged and obstructed so as to prevent rotation of the feed roll. The number of abutments 50 is in conformity with the number of rows of stamp driving teeth 47, and in the form shown ten such abutments are provided.

The feed roll 46 is also provided with a recess 51 in one end thereof at which rotary driving power is applied.

The strip of stamps 33 is supplied to the feed roll 46 from a roll 33a of such stamps, which roll is supported upon a spindle 52 having reduced end portions 52a which are carried in roll supporting plates 53 which have slots or notches 54 therein for carrying the reduced ends 52a of the spindle and permitting lifting the spindle out and dropping a roll 33a of stamps between the plates 53. The stamps are directed downawrdly toward the feed roll 46 by a guide 55 which is affixed to the plates 53. It will be understood that the plates 53 are affixed to the back wall 31a of the case which comprises a part of the frame 42. The strip of stamps 33 extends along only a portion of the periphery of the feed roll 46 and each of the stamps extends over a predetermined arc of the periphery of the feed roll. The magnitude of the arc along which one of the stamps 33 extends on the periphery of the feed roll determines the spacing or the arc between adjacent rows of stamp driving teeth 47 and also determines the spacing or arc between adjacent abutments 50 on the periphery of the feed roll. After the stamps have been driven from the feed roll, the stamps are directed through a guideway 56a of a stamp guide 56, from which the stamps are discharged to the front of the machine as illustrated in FIGS. 1 and 2. The guide 56 has an inner end 56b engaging the periphery of the feed roll to lift the stamps 33 from the feed roll, and the inner end of the stamp guide 56 is provided with slots 56c to permit passage of the stamp driving teeth 47 therethrough. It will be noted that the stamp guide 56 is affixed to the case of the machine as by screws 56d.

The strip of stamps 33 is continuously urged against the periphery of the feed roll by a presser shoe 57 which is provided with grooves 57a through which the stamp driving teeth 47 are permitted to move or swing. The presser shoe 57 is continuously urged inwardly by a spring 58 which is anchored at one end to a pin 59 affixed to the stamp guide 56 and anchored at the other end to a pin 60 on a rigid link 61. The link 61 is swingably mounted on a pin 62 carried by ears 56e which are formed integrally of the stamp guide 56. The presser shoe 57 has connecting ears 57b which mount a connecting pin 63 extending through the rigid link 61. It will be noted that the spring 58 is maintained in an over-center relation with respect to pivot 62 to continuously urge the presser shoe against the feed roll periphery, and that when the rigid link 61 is swung outwardly, the spring 58 will swing in an over-center position to retain the rigid link and presser shoe away from the feed roll so as to expose the periphery of the feed roll and permit ready and easy placement of the strips of stamps in proper relation on the feed roll and also permit guiding of the stamps onto the stamp guide 56.

A rigid strip of sheet metal 64 bears downwardly upon the roll 33a of stamps by its own weight and is pivotally mounted on a pin 64a extending between the mounting plates 53. The strip 64 restrains the roll 33a against excessive turning so as to prevent over-running of the supply roll 33a when a number of stamps are quickly pulled therefrom, it being understood however, that the roll 33a is free to rotate when the stamps are actually pulled therefrom by the feed roll. Means are provided for transmitting rotary driving power from the power driven shaft 44 to the feed roll 46. Such means include an annular clutch plate 65 mounted on the shaft 44 and having a key-receiving recess 65a at its inner periphery and receiving the key or pin 66 affixed to the shaft 44. The recess or key-way 65a extends therethrough the thickness of the plate 65 so as to permit limited movement of the plate 65 along the shaft. An annular clutch disc 67 bears against the plate 65 and against the feed roll 46 in the recess 51 in frictional driving relation so as to normally produce rotation of the feed roll by continuously urging the feed roll in rotation. The clutch disc 67 is continuously urged against the plate 65 and feed roll 46 by a spring 68 as hereinafter more fully described, but the frictional relation between the driven plate 65 and the feed roll will accommodate slipping when the feed roll is positively restrained so that the feed roll may be stopped while the plate 65 and shaft 44 continue to rotate.

Figure 26:
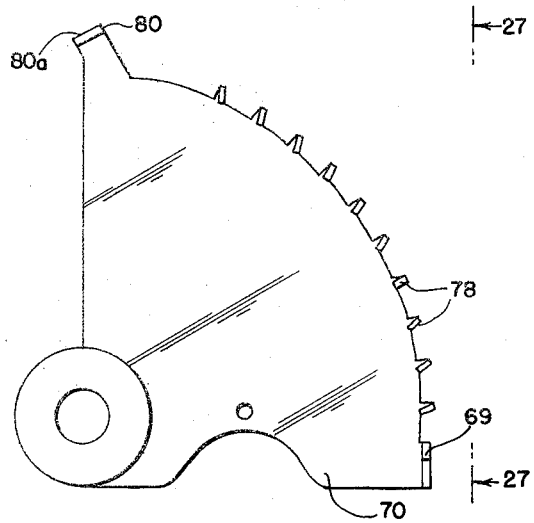
FIG. 26 is a side elevational view of the latch plate of the invention.
Figure 27:
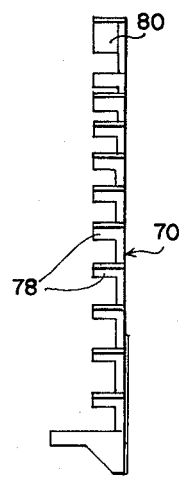
FIG. 27 is a front elevational view of the latch plate of FIG. 26.

Means are provided for alternately restraining the feed roll 46 against rotation and for permitting rotation of the feed roll. In the form shown, such means includes an elongate pawl 69 in obstructing relation with one of the abutments 50 of the feed roll. The pawl 69 is affixed to and formed integrally with an arcuately shaped latch plate 70 illustrated in detail in FIGS. 26 and 27. The latch plate 70 is mounted on a pivot 71 which is affixed to the frame plate 42b so as to be oscillatable through a small arc. It will be noted that the pawl 69 extends generally endwise from the latch plate 70 in a cantilevar manner and endwise of the feed roll into engagement with one of the abutments 50. Means are provided for normally and continuously urging the pawl 69 and latch plate 70 illustrated in detail in FIGS. 26 and 27. The in FIG. 3 into abutment obstructing position.

Means are provided for shifting and retaining the pawl 69 out of abutment obstructing relation with respect to the feed roll, and in the form shown such means includes a plurality of keys 38 engageable by a person's finger. Each of the keys 38 has an elongate plate-like key bar 72 affixed thereto and extending inwardly from the key through the cover 32. The frame plate 42b is offset at 42b' and is provided with a plurality of key bar guiding apertures 73 at the offset through which the key bars 72 extend for longitudinal sliding movement. Springs 74 bear inwardly against the washer 74a which lies on the outer edge of the frame plate 42b and bears outwardly against the keys 38 for normally urging each of the keys outwardly. Each of the key bars 72 is provided with an elongate slot 72a therein, and the frame plate 42b has a plurality of key bar guiding pins 75 each being affixed to the frame plate 42b and each extending through the slot 72a of a corresponding key bar. It will be noted that the inner end of each of the key bars is movable along the pin 75 in a sideward direction, transversely of the key bar, but the guide apertures 73 and the pins 75 prevent any edgewise transverse movement of the key bars. A plurality of leaf springs 76 are bent back upon themselves in a substantially U-shape and have the opposite ends thereof mounted upon the pins 75 for restraining transverse sideward movement of the inner ends of the key bars, but permitting limited sideward movement of the key bars as viewed in FIG. 12 for purposes hereinafter more fully defined. It will be noted that the several key bars 72 all project substantially radially inwardly toward the latch plate mounting pivot 71, and that the key bars are disposed in alignment with each other along the periphery of the latch plate 70. Furthermore, the several key bars 72 are grouped together along a predetermined arc for purposes hereinafter more fully described.

Means are provided on the several key bars 72 and on the latch plate 70 for cooperatively producing limited swinging of the latch plate 70 and raising of the pawl 69 in response to depression of one of the keys 38; and in the form shown such means include actuating cams 77 facing obliquely inwardly and formed on the forward edges of the key bars 72 and confronting and engaging cantilever cam followers or fingers 78 formed integrally of the latch plate 70 and projecting transversely therefrom.

It will be seen that depression of any one of keys 38 and the corresponding inward travel of the key bar, the camming edge 77 crosses the cam follower 78 to ride upwardly therealong thereby shifting the pawl 69 upwardly and out of obstructing relation with the feed roll abutment 50, thereby allowing the feed roll to be rotated under influence of the clutch plate 65 and shaft 44.

Means are also provided for retaining the latch plate 70 and pawl 69 in shifted position and in the form shown, such means include an outwardly facing abutment 79 on each of the key bars 72 for engaging and being retained by the corresponding cantilever cam follower which, in cooperation with the abutment 79 acts as a keeper. As a result of inward longitudinal shifting of any one of the key bars 72, the latch plate 70 is thereby locked in shifted position.

The latch plate 70 also has an additional cam 80 formed thereon and projecting transversely therefrom. The cam 80 has an operating or camming face 80a oriented obliquely of the direction of movement thereof with latch plate 70 and bearing against a cam following roller 81a of a switch 81 which is mounted on the frame plate 42b. Normally the switch 81 is in open condition, and upward or counterclockwise shifting of the latch plate 70 as viewed in FIG. 3 produces closing of the switch through operation of the cam 80. Switch 81 is connected in series with the motor 43 for supplying power thereto and causing operation thereof to commence. It will therefore be seen that depression of any one of the keys 38 also causes starting of motor 43.

Means are provided for stopping rotation of the feed roll 46 after the desired number of stamps have been moved thereover and dispensed through the guideway 56a. In the form shown such means includes a rotor 82 which is also rotatably mounted upon the pin 71 which is affixed on the frame plate 42b. In the form shown, the rotor 82 is formed of rigid molded plastic material. The rotor is disposed in close proximity with the latch plate 70 and the periphery of the rotor 82 lies along the aligned inner ends of the key bars 72, and as seen in FIG. 12, the latch plate 70 and rotor 82 are actually disposed between the inner ends of the key bars 72 and the frame plate 42b. The rotor 82 has a plurality of key bar-engaging and camming release elements 83 on one surface thereof. In the form shown, the release elements 83 are formed integrally of the rotor 82 and are substantially wedged-shaped for engaging the inner ends of depressed key bars 72 and, by camming action, producing sideward movement of the inner end of the key bar away from frame plate 42b and free of the corresponding cantilever cam follower and keeper 78 so as to release the key bar from the keeper 78, thereby permitting outward longitudinal shifting of the key bar which has previously been retained at its abutment 79 by its keeper 78.

It will be noted in the form shown that the rotor 82 has five camming release elements 83 spaced equally around the periphery thereof. All of the inner ends of the several key bars are disposed within the arc between next adjacent release elements 83 on the rotor 82 so as to require rotation of the rotor 82 through only one of such arcs to accomplish releasing of any or all the key bars which may be depressed and locked.

A motor stopping switch 84 is mounted on a suitable bracket 84a connected with the frame, and a switch operating cam follower 84b is disposed adjacent the periphery of rotor 82 for engaging the camming release elements 83. The switch 84 is a normally closed switch, and cooperation between one of the camming elements and the cam follower 84b operates to effect opening of the switch 84. As hereinafter more fully pointed out, it will be noted that during each cycle of operation the starting switch is normally reopened prior to actual stopping of motor 43 which is accomplished through operation of stop switch 84.

Means are provided for driving the rotor 82 in cooperative relation with driving of feed roll 46 and for stopping or indexing the rotor 82 in predetermined relation with the several key bars 72 at the end of each cycle of operation. In the form shown, such means includes gear teeth 82a on the periphery of rotor 82, and a driving gear 85 mounted on shaft 44. A control element or rigid disc 86 is drivably connected to, and in the form shown, formed integrally with the drive gear 85. A clutch disc 87 engages the control disc 86 and also engages the clutch plate 65 to effect a frictional driving relation between the clutch plate 65 and the drive gear 85 for continuously urging the gear in rotary driving movement, but permitting slipping in the frictional driving relation when the gear is restrained. In the form shown, the gear ratio between gear 85 and the gear teeth 82a of the rotor produces one-fifth of a revolution of the rotor 82 for each complete revolution of the gear 85. The periphery of the control disc 86 is disposed adjacent the periphery of feed roll 46 and is also provided with a single abutment 88 engageable by pawl 69 to be restrained from rotation thereby. The gear 85 is freely rotatable relative to shaft 44 so as to permit continued rotation of shaft 44 when gear 85 is stopped.

A continued spring pressure as a result of operation of spring 68 maintains a continued frictional relation between the control disc 86 and the clutch plate 65.

The construction of the dispensing apparatus 35 is substantially identical to the dispensing apparatus 36 and includes a stamp feed roll 89 mounted for independent rotation on shaft 44 and having dovetail recesses 89a receiving inserts 90a defining stamp engaging and driving teeth 90. Ten such rows of stamp engaging and driving teeth 90 are disposed around the periphery of feed roll 89. The teeth 90 are of such size and spacing in the rows to accommodate the holes of the stamps 34. A clutch plate 91 is slotted at 91a at its inner periphery to receive the key 92 drivingly connected at the clutch plate 91 to the drive shaft 44. Clutch disc 93 maintains a frictional driving relation between the clutch plate 91 and feed roll 89 under influence of the clutch plate 91. It will be seen that clutch plate 91 is restrained against movement along the shaft by spring 68 and retainer 68a which is secured to the shaft 44 by an E-ring 68b. Spring 68 also bears against bearing 45 and continuously urges the bearing against drive gear 94 which bears against clutch disc 95 to maintain a continuous frictional driving relation with the clutch plate 91. The pressure of spring 68 is thereby transmitted along the shaft through drive gear 94, the hub of feed roll 89, bearing 45, drive gear 85 to the clutch discs 67 and 87 so as to maintain a continuous frictional driving relation between the clutch plate 65, feed roll 46 and drive gear 85.

Dispensing apparatus 35 also includes stamp guide 96, presser shoe 97, stamp roll mounting spindle 98 supported on plates 99 and restrained from excessive rotation by rigid strip 100.

The rotation of feed roll 89 is controlled by pawl 101 formed integrally of latch plate 102 normally urged downwardly by spring 103 and provided with the cam following keeper elements 104 to cooperate with the camming portions of key bars 105 slidably mounted in the frame plate 42c and guided by pins 106. The key bars 105 are yieldingly movable in a sideward direction along pins 106 and against the influence of spring 107.

The latch plate 102 has a cam 108 operating the starting switch 109 which is mounted on the frame plate 42c.

Drive gear 94 is meshed with the teeth of rotor 110 which is mounted on a pin 111 affixed to the frame plate 42c which also mounts the latch plate 102. The rotor 110 has wedged-shaped camming release elements 112 thereon and cooperating with the inner ends of key bars 105 for moving said key bars sidewards away from frame plate 42c and over the ends of the cantilever keepers 104. A stop switch 113 is also controlled by the release elements 112 so as to open the switch 113 when the cam follower is engaged by one of the elements 112.

*Operation*

From the standpoint of the operator of the machine, operation is extremely simple. If a number of dollar stamps are to be dispensed, one of the keys 38 is depressed and likewise if a number of tens stamps are to be dispensed, one of the keys 39 is depressed. In quickly effecting a stamp transaction, the operator may press one of the keys 38 and one of the keys 39 substantially simultaneously or in rapid succession, thereby effecting dispensing of stamps from both dispensing apparatus 36 and 35 substantially simultaneously. If one of the dispensing apparatus completes its operation prior to the other dispensing apparatus, the motor and drive shaft 44 will continue to operate until all the stamps desired from both dispensing apparatus have been dispensed.

More specifically, let us assume for the moment that the operator desires dispensing of four dollar stamps and the key 38 designated "4" is depressed. The corresponding key bar moves inwardly and cams a corresponding cam follower 78 upwardly, thereby effecting closing of switch 81 and the corresponding starting of motor 43. Depression of the key bar and movement of the latch plate 70 also effects raising of pawl 69 and releasing of the feed roll 46 and control element 86, both of which start rotating immediately under influence of shaft 44. As the stamps immediately start moving over the rotating feed roll 46 and feeding outwardly from the stamp guide 56, the rotor 82 also immediately starts turning under influence of drive gear 85.

As the rotor 82 starts turning counterclockwise as viewed in FIG. 3, one of the release elements 83 immediately starts moving along the aligned key bars 72 and in view of the fact that only the fourth key bar is longitudinally shifted inwardly, no engagement by the release element 83 of the first three key bars is effected. However, the release element 83 will engage the inwardly shifted fourth key bar, and at this instant three stamps will have been dispensed and the fourth stamp is moving outwardly from the stamp guide 56. The release element in engaging the inwardly shifted key bar will cam and move the key bar against the pressure of the corresponding spring 76 so as to release the key bar from the retaining keeper 78 and allow the key bar to move outwardly. Because the inwardly shifted key bar had been retaining the latch plate 70 in upwardly shifted position, release of the keeper 78 permits springs 70a to return the latch plate downwardly, thereby causing the pawl 69 to engage the periphery of the rotating feed roll and to also engage the periphery of the rotating control disc 86.

At the instant pawl 69 is engaged by the next abutment 50, the dispensing of the fourth stamp will have been completed and the feed roll 46 will thereby be stopped by the pawl 69, thereby causing slipping in the friction driving relation between the clutch plate 65 and the feed roll 46. Clutch plate 65 continues to rotate and continues to drive the gear 85 through the clutch disc 87.

The rotor 82 continues to revolve and the release element 83 which had previously released the key bar continues to move along the aligned key bars. As the gear 85 and rotor 82 continue to revolve, the abutment 88 of the control disc 86 will come into engagement with the pawl 69, and at this instant, another of the release elements 83 is indexed or positioned with respect to the aligned key bars 72 so as to be prepared for another cycle of operation. Further, at the instant abutment 88 encounters pawl 69 so as to stop the rotor 82, the cam follower 84b of switch 84 is operated by another of the camming release elements 83 to open the switch 84.

It will be understood that at the moment the feed roll 46 was stopped by returning of latch plate 70 to its normal position under influence of spring 70a, the start switch 81 was reopened because of movement of cam 80 along cam follower 81a; however at this time, the cam follower 84b of switch 84 had already been permitted to move and thereby close switch 84 because the release element 83 which had been previously holding switch 84 open had moved away from the cam follower 84b. Therefore, when the feed roll stops, control of the motor 43 is transferred from switch 81 which at that moment reopens to switch 84 which is already closed. Switch 84 again reopens under the influence of the rotor 82 when returned to index position.

In the event that one of the keys 39 had also been depressed while the dispensing apparatus 36 was operating, motor 43 continues to operate because switch 113 remains closed. In this event, both the stamp feed roll 46 and the gear 85 are retained by the pawl 69 while the clutch plate 65 continues to rotate.

Whereas detail reference has been made to the operation of the dispenser 36, it is pointed out that the operation of dispenser 35 is easily identified to that of dispenser 36. During each cycle of operation of the dispenser 35, the feed roll 89 is rotated through a predetermined number of arcs corresponding to the number of stamps to be dispensed and is then stopped by the pawl 101. The control element, or disc, continues to revolve so as to continue rotation of the rotor until the index position is reached as illustrated in FIG. 5, whereupon the gear 94 and the control element are stopped by the pawl. In the event that dispenser 36 has completed its operation, or is otherwise not operating, the motor 43 will thereupon be stopped by the opening of switch 119.

It will be noted that dispenser 35 has only nine keys. In view of the fact that stamps 33 each relate to a one dollar amount and are each the equivalent of ten stamps 34, there is no occasion for dispensing more than nine of the stamps 34 from the dispenser 35.

It will, of course, be understood that various changes may be made in the form, details, arrangement and proportions of the various parts without departing from the scope of our invention.

What is claimed is:

1. A dispensing machine for stamps in strip form, comprising a frame, stamp supply and guide means on the frame, a stamp feed roll having a peripheral surface receiving stamps thereover, each stamp extending through a predetermined arc of said peripheral surface, said feed roll having a plurality of abutments around the periphery thereof, each of said abutments being spaced from adjacent abutments by said predetermined arc, means on the frame journaling and driving said feed roll and including a motor-driven rotary driving element in continuous frictional driving relation with said feed roll and continuously urging said feed roll to effect rotation thereof, said feed roll being adapted to slip in the frictional relation with said driving element when restrained from rotation, a retaining element disposed adjacent said feed roll in confronting relation with one of said abutments and being shiftably mounted on the frame for alternately engaging and releasing said abutments to alternately permit and prevent rotation of the feed roll and feeding of stamps thereover, and means connected with said retaining element and shifting said element into and out of obstructing relation with said abutments in accordance with rotation of the feed roll through a number of said predetermined arcs to effect dispensing of a number of stamps.

2. A dispensing machine for stamps in strip form, comprising a frame, stamp supply and guide means on the frame, a stamp feed roll having a peripheral surface receiving stamps thereover and also having an end face, each stamp extending through a predetermined arc of said peripheral surface, said feed roll having a plurality of abutments around the periphery thereof, each of said abutments being spaced from adjacent abutments by said predetermined arc, means on the frame journaling and driving said feed roll and including a motor-driven rotary driving element bearing against said end face of said feed roll for continuously urging and driving said feed roll to effect rotation thereof, said feed roll and driving element being in frictional relation with each other and said feed roll being adapted to slip in the frictional relation with said driving element when restrained from rotation, spring means continuously urging said feed roll and rotary driving element toward each other and continuously maintaining said driving element in frictional driving relation with the end face of said feed roll, a retaining element disposed adjacent said feed roll in confronting relation with one of said abutments and being shiftably mounted on the frame for alternately engaging and releasing said abutments to alternately permit and prevent rotation of the feed roll and feeding of stamps thereover, and means connected with said retaining element and shifting said element into and out of obstructing relation with said abutments in accordance with rotation of the feed roll through a number of said predetermined arcs to effect dispensing of a number of stamps.

3. A dispensing machine for stamps in strip form, comprising a frame, a stamp supply and guide means on the frame, a stamp feed roll having a peripheral surface receiving the stamps thereover and also having a smooth end surface, each stamp extending through a predetermined arc of said peripheral surface, said feed roll having a plurality of abutments around the periphery thereof, each of said abutments being spaced from adjacent abutments by said predetermined arc, a motor-driven drive shaft journaled on the frame and mounting said feed roll for rotation relative to the shaft, means engaging said feed roll and preventing movement thereof along the shaft, a rotary driving element mounted on the shaft and rotating therewith and engaging said end surface of said feed roll in frictional driving relation, said rotary driving element and feed roll being adapted to slip in the frictional relation therebetween to permit said feed roll to be stopped when restrained from rotation, spring means urging said rotary driving element along the shaft and endwise against said end surface of the feed roll in continuous frictional driving relation with the feed roll and continuously urging said feed roll to effect rotation thereof, a retaining element disposed adjacent said feed roll in confronting relation with one of said abutments and being shiftably mounted on the frame for alternately engaging and releasing said abutments to alternately permit and prevent rotation of the feed roll and feeding of stamps thereover, and means connected with said retaining element and shifting said element into and out of obstructing relation with said abutments in accordance with rotation of the feed roll through a number of said predetermined arcs to effect dispensing a number of stamps.

4. A dispensing machine for stamps in strip form, comprising a frame, stamp supply and guide means on the frame, a stamp feed roll having a peripheral surface receiving stamps thereover, each stamp extending through a predetermined arc of said peripheral surface, said feed roll having a plurality of abutments around the periphery thereof, each of said abutments being spaced from adjacent abutments by said predetermined arc, means on the frame journaling and driving said feed roll and including a motor-driven rotary driving element in continuous frictional driving relation with said feed roll and continuously urging said feed roll to effect rotation thereof, said feed roll being adapted to slip in the frictional relation with said driving element when restrained from rotation, a roll-retaining pawl disposed adjacent said feed roll in confronting relation with one of said abutments and being shiftably mounted on the frame for alternately engaging and releasing said abutments to alternately permit and prevent rotation of the feed roll and feeding of stamps thereover, means urging said pawl into obstructing relation with said abutments, means moving and retaining said pawl out of obstructing relation with said abutments and including a manually depressible key shiftably mounted on the frame and also including cooperative camming and releasable lock mechanism connected with the pawl and key and effecting shifting and retaining of the pawl out of obstructing relation with the abutments in response to depressing of the key, and operable release mechanism drivably connected with said rotary driving element and operating in predetermined relation with rotation of said feed roll and effecting release of said lock mechanism and said pawl to stop the feed roll after the feed roll has turned through an arc to carry a number of stamps thereover.

5. A dispensing machine for stamps in strip form, comprising a frame, stamp supply and guide means on the frame, a stamp feed roll having a peripheral surface receiving stamps thereover, each stamp extending through a predetermined arc of said peripheral surface, said feed roll having a plurality of abutments around the periphery thereof, each of said abutments being spaced from adjacent abutments by said predetermined arc, means on the frame journaling and driving said free roll and including a motor-driven rotary driving element in continuous frictional driving relation with said feed roll and continuously urging said feed roll to effect rotation thereof, said feed roll being adapted to slip in the frictional relation with said driving element when restrained from rotation, a feed roll-retaining pawl disposed adjacent said feed roll in confronting relation with one of said abutments and being shiftably mounted on the frame for alternately engaging and releasing said abutments to alternately permit and prevent rotation of the feed roll and feeding of stamps thereover, means urging said pawl into obstructing relation with said abutments, additional means moving and retaining said pawl out of obstructing relationship with said abutments and including a plurality of manually depressible keys shiftably mounted on the frame for inducing dispensing of various numbers of stamps, said additional means also including a plurality of cooperative camming and releasable lock mechanisms aligned with each other and each of said mechanisms being connected with the pawl and with a respective key and effecting shifting and retaining of the pawl out of obstructing relation with the abutments in response to depressing of the corresponding key, and operable release mechanism on the frame and including a release element movable along said aligned lock mechanisms and engaging and effecting release of said lock mechanisms, and said release mechanism also including driving means connected with said rotary drive element and producing movement of said release element along said aligned lock mechanism at a rate proportional to rotation of the feed roll and feeding of stamps thereover, and thereby cause release of said pawl and stopping of the feed roll in accordance with the depression of a particular key.

6. The dispensing machine of claim 4 wherein said release mechanism includes a rotor journaled on the frame and mounting said release element on the periphery thereof, said plurality of cooperative camming and releasable lock mechanisms being disposed adjacent each other along the periphery of said rotor, whereby to effect releasing of the pawl in response to rotation of said rotor.

7. A dispensing machine for stamps in strip form, comprising a frame, stamp supply and guide means on the frame, a stamp feed roll having a peripheral surface receiving and dispensing stamps thereover, each stamp extending through a predetermined arc of said peripheral surface, said feed roll having a plurality of abutments around the periphery thereof, each of said abutments being spaced from adjacent abutments by said predetermined arc, means on the frame journaling and driving said feed roll and including a motor-driven rotary driving element in continuous frictional driving relation with said feed roll and continuously urging said feed roll to effect rotation thereof, said feed roll being adapted to slip in the frictional relation with said driving element when restrained from rotation, pawl means disposed adjacent said feed roll in confronting relation with one of said abutments and being shiftably mounted on the frame for alternately engaging and releasing said abutments to alternately permit and prevent rotation of the feed roll and feeding of stamps thereover, means urging said pawl means into obstructing relation with said abutments, additional means moving and retaining said pawl means out of obstructing relation with said abutments and including a plurality of manually depressible keys shiftably mounted on the frame for inducing dispensing of various numbers of stamps, said additional means also including a plurality of cooperative camming and releasable lock mechanisms aligned with each other and each of said mechanisms being connected with the pawl means and with a respective key and effecting shifting and retaining of the pawl means out of obstructing relation with the abutments in response to depressing of the correspoinding key, and cyclically movable operable release means mounted on the frame and including a release element movable along said aligned lock members and engaging and effecting release of said lock mechanisms, said release mechanism also including driving means having continuous frictional driving relation with said rotary driving element and being continuously urged thereby to move said release means along said lock mechanisms, said release mechanism also including a restrainable rotary control element adjacent said pawl means and connected with said drive means to stop the release mechanism and induce slipping at the frictional driving relation with said rotary driving element when the control element is stopped, said rotary control element having an abutment on the periphery thereof and engageable with said pawl means to stop and index said release mechanism in predetermined position with respect to the lock mechanism at the end of each stamp dispensing cycle, said feed roll and control element being cooperatively released by said pawl means to effect dispensing of stamps over the feed roll and movement of said release mechanism and release element along the aligned lock mechanisms.

8. The dispensing machine of claim 7 wherein said release means includes a rotor connected to and driven by said driving means, said release element and a plurality of additional release elements being secured on the periphery of said rotor in spaced relation with each other for individually and sequentially moving along and engaging said aligned lock mechanisms, the driving means of said release mechanism producing movement of one of said release elements along said aligned lock mechanisms during each stamp dispensing cycle and said rotary control element cooperating with said pawl means in stopping and indexing said rotor and one of said release elements for immediate movement along said aligned lock mechanisms during the next subsequent stamp dispensing cycle.

9. Key mechanism for a dispensing machine, comprising a frame, an elongate key bar having inner and outer ends, said outer end having means receiving the tip of a person's finger whereby to effect longitudinal sliding movement of the key bar, the key bar also having an actuating portion, said key bar having a retaining abutment adjacent said inner end and facing said outer end, means mounting said key bar on the frame for longitudinal sliding movement and for limited movement in opposite first and second directions transversely of the key bar, spring means continuously urging said key bar longitudinally outwardly, spring means urging said key bar in said first transverse direction, control means on the frame engageable with said actuating portion and operating in response thereto and also retaining said key bar in depressed position, said control means including a cantilever keeper adjacent the key bar and said keeper having an unobstructed end, said keeper extending in said second direction toward said unobstructed end and extending across the abutment of the key bar in depressed position to retain the key bar against outward movement, and movable means on the frame and effecting release of the depressed key bar from said keeper and including a release element movable into engagement with the key bar and effecting transverse movement thereof in said second direction to move the key bar free of said keeper and permit the key bar to move longitudinally outwardly.

10. Key mechanism for a dispensing machine, comprising a frame, an elongate key bar having inner and outer ends, said outer end having means receiving the tip of a person's finger whereby to effect longitudinal sliding depression of the key bar, the inner end of the key bar having an actuating portion, said key bar having a retaining abutment adjacent said inner end and facing said outer end, said key bar also having a longitudinally extending slot adjacent said inner end, means mounting said key bar on the frame for longitudinal sliding movement and including a rigid pin extending through said slot and permitting limited movement of the key bar in first and second transverse directions, a spring anchored on said pin and bearing against said key bar to yieldingly restrain the key bar from transverse movement and to guide the key bar in longitudinal movement, spring means continuously urging said key bar longitudinally outwardly, control means on the frame engageable with said actuating portion and operating in response thereto and also retaining said key bar in depressed position, said control means including a cantilever keeper adjacent the key bar and said keeper having an unobstructed end extending in said second direction and across the abutment of the key bar in depressed condition to retain the key bar against longitudinal outward movement, and moveable means on the frame and effecting release of the depressed key bar from said keeper and including a release element movable into engagement with the key bar and effecting transverse movement thereof in said second direction and against the reaction of said spring to move the key bar free of the keeper to permit the key bar to move longitudinally outwardly.

11. The key mechanism of claim 9 wherein said movable means includes means moving said release element transversely of the key bar and transversely of said first and second directions, said release element having an oblique key bar-engaging camming surface moving said key bar in said second direction and thereby free the key bar of the keeper.

12. Key mechanism for a dispensing machine, comprising a frame, an elongate key bar having inner and outer ends, fore and aft edges and first and second sides, said outer end having means receiving the tip of a person's finger whereby to effect longitudinal sliding depression of the key bar, one of said edges having an oblique inwardly facing camming portion adjacent the inner end and also having a notch therein defining an outwardly facing abutment, means mounting and guiding said key bar on the frame for longitudinal sliding movement and including guide means engaging the inner end of the key bar and preventing transverse movement thereof in fore and aft directions, said guide means permitting limited transverse movement of the inner end of the key bar in one sideward direction, spring means continuously urging said key bar longitudinally outwardly, spring means engaging said key bar and yieldingly restraining transverse movement thereof in said one sideward direction, control means on the frame and including a moveable control member, said control member having a cantilever cam follower adjacent said camming portion of the edge of said key bar and engageable therewith when the key bar is depressed, said cantilever cam follower having an unobstructed end and said cam follower extending toward said unobstructed end in said one sideward direction for extending across the key bar abutment and retaining the key bar against outward longitudinal movement, said camming portion of the key bar producing movement of said cantilever cam follower in a direction transversely of the key bar when the key bar is depressed to effect operation of said control means, and movable means on the frame and effecting release of the depressed key bar from said cantilever cam follower and including a release element movable into engagement with said key bar and effecting transverse movement thereof in said one sideward direction to move the key bar free of said follower and permit the key bar to move longitudinally outwardly.

References Cited by the Examiner

UNITED STATES PATENTS 2,806,693  9/1957  Seeley _____ 226—110
2,962,282  11/1960  Bergland _____ 226—109

M. HENSON WOOD JR., *Primary Examiner.*

RAPHAEL M. LUPO, *Examiner.*